(12) United States Patent
Du et al.

(10) Patent No.: US 12,494,494 B2
(45) Date of Patent: Dec. 9, 2025

(54) HIGH VOLTAGE CATHODE MATERIALS FOR NON-AQUEOUS AMMONIA BASED

(71) Applicants: Lin-Shu Du, Lansdale, PA (US); Natalie Aulicino, Cinnaminson, NJ (US); Art Driedger, Spring City, PA (US); James Pastore, Collegeville, PA (US); Giuseppe Di Benedetto, Nutley, NJ (US); Jeff Swank, Montgomery Village, MD (US)

(72) Inventors: Lin-Shu Du, Lansdale, PA (US); Natalie Aulicino, Cinnaminson, NJ (US); Art Driedger, Spring City, PA (US); James Pastore, Collegeville, PA (US); Giuseppe Di Benedetto, Nutley, NJ (US); Jeff Swank, Montgomery Village, MD (US)

(73) Assignee: MAXPOWER, INC., Harleysville, PA (US)

( * ) Notice: Subject to any disclaimer, the term of this patent is extended or adjusted under 35 U.S.C. 154(b) by 514 days.

(21) Appl. No.: 17/300,205

(22) Filed: Apr. 9, 2021

(65) Prior Publication Data
US 2022/0328848 A1      Oct. 13, 2022

(51) Int. Cl.
| | |
|---|---|
| H01M 6/14 | (2006.01) |
| H01M 4/02 | (2006.01) |
| H01M 4/38 | (2006.01) |
| H01M 4/48 | (2010.01) |
| H01M 4/583 | (2010.01) |
| H01M 4/66 | (2006.01) |
| H01M 4/72 | (2006.01) |
| H01M 50/414 | (2021.01) |
| H01M 50/491 | (2021.01) |

(52) U.S. Cl.
CPC .......... *H01M 6/145* (2013.01); *H01M 4/382* (2013.01); *H01M 4/48* (2013.01); *H01M 4/583* (2013.01); *H01M 4/661* (2013.01); *H01M 4/72* (2013.01); *H01M 50/414* (2021.01); *H01M 50/491* (2021.01); *H01M 2004/021* (2013.01); *H01M 2300/002* (2013.01)

(58) Field of Classification Search
CPC .................................................. H01M 10/0569
See application file for complete search history.

(56) References Cited

U.S. PATENT DOCUMENTS

| | | | |
|---|---|---|---|
| 3,082,284 A | 3/1963 | Mount | |
| 3,202,548 A * | 8/1965 | Adlhart | H01M 6/38 |
| | | | 429/188 |
| 3,445,295 A | 5/1969 | Smith et al. | |
| 3,943,001 A | 3/1976 | Miles | |
| 2019/0123347 A1* | 4/2019 | Kim | H01M 4/485 |
| 2021/0399283 A1* | 12/2021 | Khokhlov | H01M 4/244 |

(Continued)

OTHER PUBLICATIONS

Zhang Shimin : "Feasibility study of an Aqueius Zinc-Persulfite Battery," in College of chemistry, Hunan Dec. 15, 2006 China.

*Primary Examiner* — Stephan J Essex (57) ABSTRACT

Novel, high voltage cathode active materials for non-aqueous ammonia based primary and reserve batteries are described therein, as well as non-aqueous electrolytes supporting high voltage, and various anodes, separators and cell constructions are disclosed. Said materials provide higher power output at low temperatures over prior art ammonia based batteries.

11 Claims, 6 Drawing Sheets

(56) References Cited

U.S. PATENT DOCUMENTS

2022/0006075 A1\* 1/2022 Kovacs ............... H01M 10/054
2023/0187623 A1\* 6/2023 Yadav .................... H01M 4/62
                                                      429/224

\* cited by examiner

HIGH VOLTAGE CATHODE MATERIALS FOR NON-AQUEOUS AMMONIA BASED

BACKGROUND OF THE INVENTION

Field of the Invention

This invention relates to low temperature, high power primary and reserve batteries with ammonia based electrolyte and high voltage cathodes.

These batteries have higher power output due to higher voltage of persulfates and molybdenum oxide cathodes than prior art cathodes, and have comparable power density at low temperatures as existing ammonia based batteries.

Description of the Prior Art

It has been recognized that there is a need for higher energy density and high power batteries, working at very low temperature, and having extremely fast activation time (10-300 ms).

Prior art ammonia based batteries have 2 V cathode meta-dinitrobenzene when pairing with magnesium based anode, which results in relatively low power output and thus larger and more cells are needed in a final battery assembly.

Due to corrosiveness of the ammonia electrolyte, practical applications are limited to reserve batteries. Low viscosity of liquid ammonia at low temperature (for example, −0.35 cP at −55° C.) provides extremely fast activation time (10-300 ms).

In addition, due to the strong, solvation ability of the nitrogen longer pair in the ammonia molecule, the conductivity of an ammonia based electrolyte is usually high over a wide temperature range. This allows ammonia based batteries to operate at high rate (>20 mA/cm$^2$) at temperature ranging from −55 to +75° C.

The development has shown that the 2 V cell voltage can be obtained via the use of meta-dinitrobenzene (m-DNB) cathode. There is a demand for miniature reserve battery applications, such as medium calibers, which requires low temperature and high rate operations with extremely fast activation at small footprint and higher energy density. Therefore there is a need for improving ammonia based cell load voltage to be higher than 2 V.

Prior art ammonium based batteries are described in the U.S. Pat. Nos. 3,445,295, 3,082,284 and 3,943,001, as examples.

SUMMARY OF THE INVENTION

It has now been found that some oxidants with reduction potentials higher than the reduction potentials of NO$_2$ group on m-DNB can have high load voltages. The reactive oxidants by nature having high power ability (high reactivity) are suitable for applications especially at low temperatures.

A few cathode compounds found in our study include persulfates, permanganates and molybdenum oxide.

The open circuit voltages (OCV) and load voltages of these cathode materials are higher than current state of the art cathode—m-DNB. Some of these cathodes can reach 3 V when used in ammonia based batteries.

These cathodes with higher load voltages reduce number of cells in a battery.

The benefits of higher voltages also include the decrease of battery size and reduction of inter cell leakage, and increased power output of the battery.

The higher voltage is also possible by using non-aqueous electrolyte, comprising at least one non-aqueous solvent from the group including NH$_3$, methyl format, methyl ether and dimethoxy ether, with at least one salt from the group including LiPF$_6$, LiBF$_4$, LiSCN, NH$_4$SCN, KSCN and LiNO$_3$, dissolved therein.

Ammonia based primary and reserve batteries of the invention comprise: an alkali metal or alkali earth metal anode(s), (preferably magnesium), in contact with a tabbed current collector; a cathode (s) being reduced upon discharge, such as a persulfate based salt like (NH$_4$)$_2$S$_2$O$_8$, or K$_2$S$_2$O$_8$, or Na$_2$S$_2$O$_8$, coated on and in contact with stainless steel current collector; a separator between the anode and cathode, such as 90% porous glass non-woven paper; and an electrolyte, such as ammonia NH$_3$ with a salt, such as KSCN, in a separate pressure ampoule.

The battery is in a sealed housing and is stored dry, and is activated by the electrolyte by mechanically punching the wall of the ampoule, which is placed next to the battery. The activation is done only when the battery is needed to power a device. The battery may be multi-celled.

The above cathodes may be coated on a current collector by well known various methods via a slurry, comprising the active material, plastic binder and conductive carbon powder in a solvent, which solvent evaporates after coating.

The persulfate cathodes may be also replaced by permanganate based cathodes, or by molybdenum oxide based cathodes.

The principal object of the invention is to provide low temperature, high energy and power ammonia electrolyte based battery, having higher load voltage and thus less cells over prior art, and thus reducing the size and cost of the battery assembly.

A further object of the invention is to provide high voltage persulfate salt based cathodes for various cells constructions.

A further object of the invention is to provide non-aqueous electrolyte for ammonia based batteries.

Another object of the invention is to provide high power density, at low temperature operating ammonia based battery for the military.

Other objects and advantages of the invention will be apparent from the description and claims.

BRIEF DESCRIPTION OF THE DRAWINGS

The nature and characteristic features of the invention will be more readily understood from the following description taken in connection with the accompanying drawing forming part thereof, in which.

It should, of course, be understood that the description and drawings herein are merely illustrative, and that various modifications and changes can be made in the compositions and the structures disclosed without departing from the spirit of the invention.

DESCRIPTION OF THE PREFERRED EMBODIMENTS

When referring to the preferred embodiments, certain terminology will be utilized for the sake of clarity. Use of such terminology is intended to encompass not only the described embodiments, but also technical equivalents, which operate and function substantially same way to bring about the same results.

Figure 1:
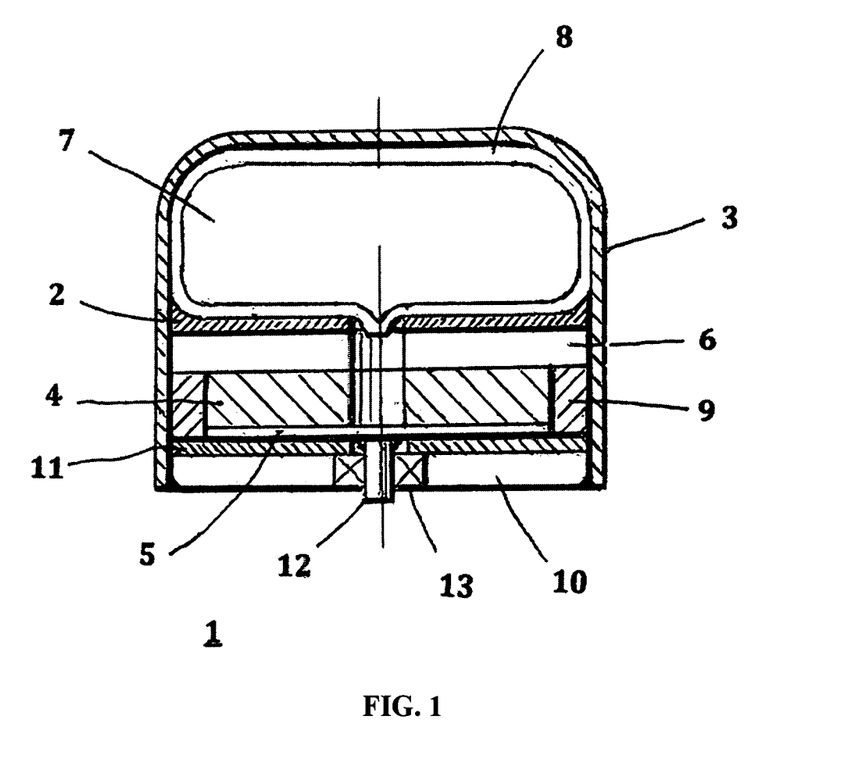
FIG. 1 is a sectional side elevational view of cylindrical ammonia based primary or reserve battery, having flat circular electrodes and the electrolyte in the ampoule placed on top of the cells.

Referring now to the FIG. 1, which is one embodiment of the invention, showing ammonium based low temperature primary or reserve battery 1 of the invention, which battery comprises: an alkali metal, such as magnesium foil anode 2; in contact with tabbed metal current collector 3; a cathode 4, such as persulfate based salt like $(NH_4)_2S_2O_8$, or $K_2S_2O_8$, or $Na_2S_2O_8$, coated on tabbed stainless steel collector 5 and in contact with the cathode 4; a separator 6, such as 90% porous non-woven glass paper, between said anode 2 and cathode 4; and an electrolyte 7, such as ammonia $NH_3$ with a salt like KSCN dissolved therein, and the electrolyte is stored in a separate pressure ampoule 8, preferably of a glass material, placed next to the battery components 2 to 6. The cathode 4 with collector 5 is insulated by ring 9.

The battery 1 is sealed dry in moisture-proof metal enclosure 3, with metal plug 10, insulating layer 11, and positive metal pin 12, sealed by a glass seal 13, and is activated by mechanically punching the wall of the ampoule 8. The activation is done only when the battery 1 is needed to power a device.

The battery may be multi-celled with the cells connected in parallel. (not shown). All structures are heat and pressure and corrosion resistant.

Figure 2:
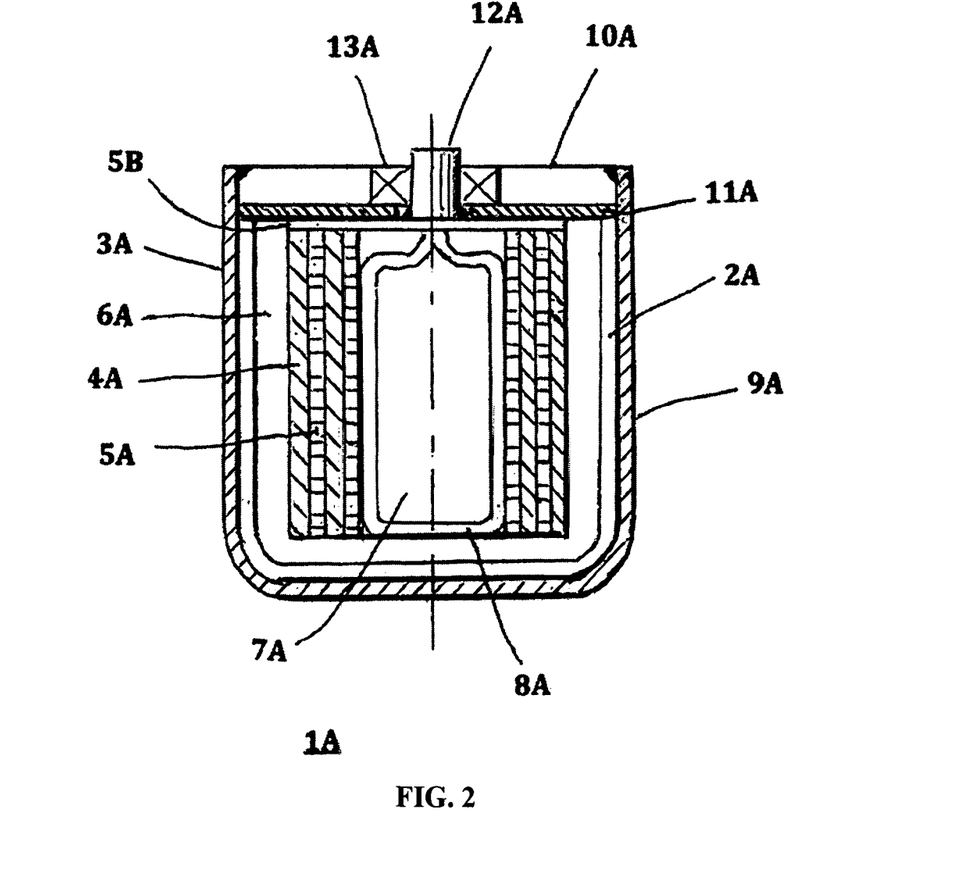
FIG. 2 is a sectional side elevational view of cylindrical ammonia based primary or reserve battery, having cylindrically wound electrodes and the electrolyte in the ampoule placed in the center of the battery.
Figure 3:
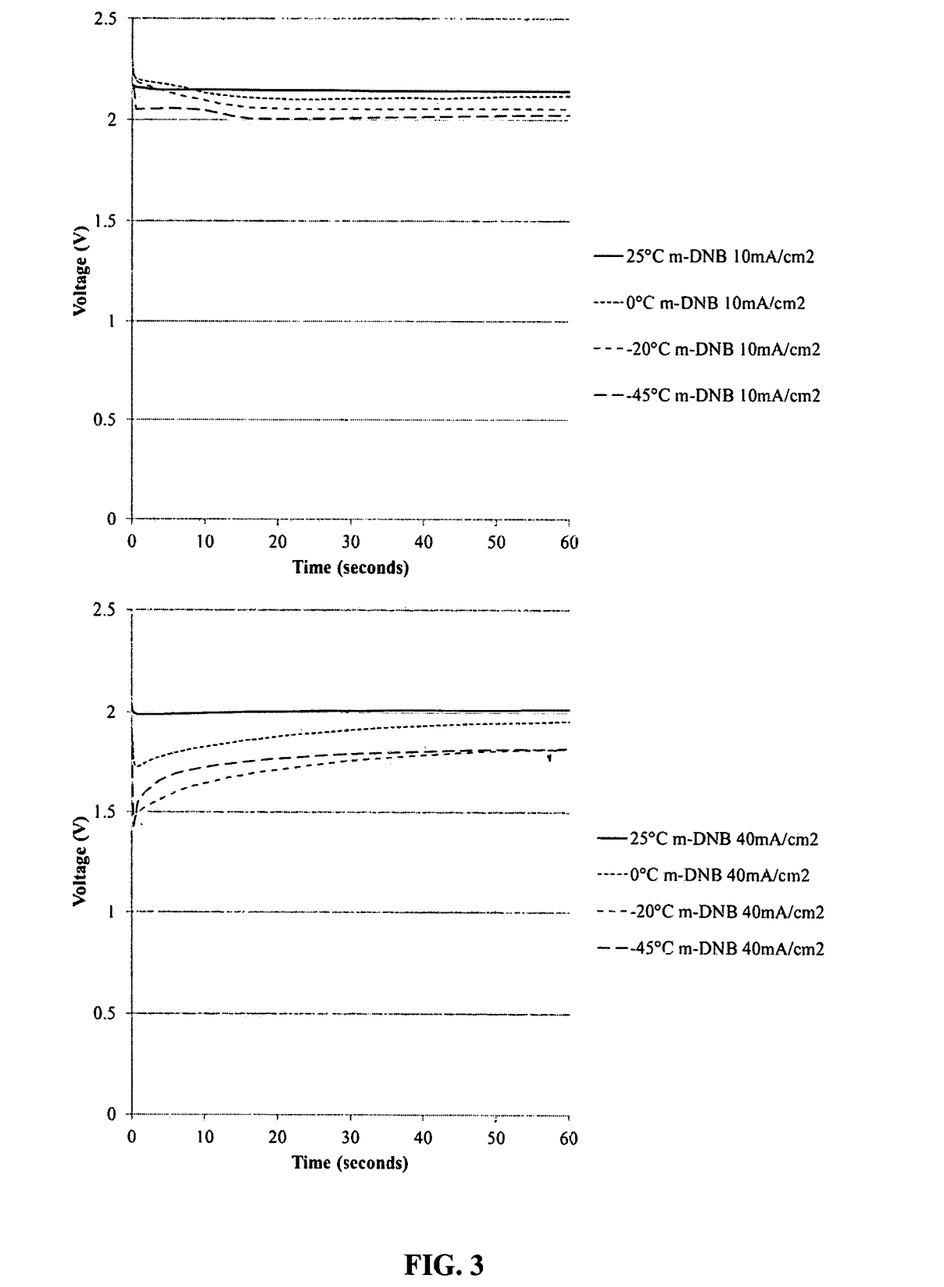
FIG. 3 is a discharge time (first 60 seconds) versus voltage diagram for cells made with standard m-dinitrobenzene type cathodes discharged at 10 mA/cm$^2$ and 40 mA/cm$^2$ over discharge temperature range of −45 to +25° C.
Figure 4:
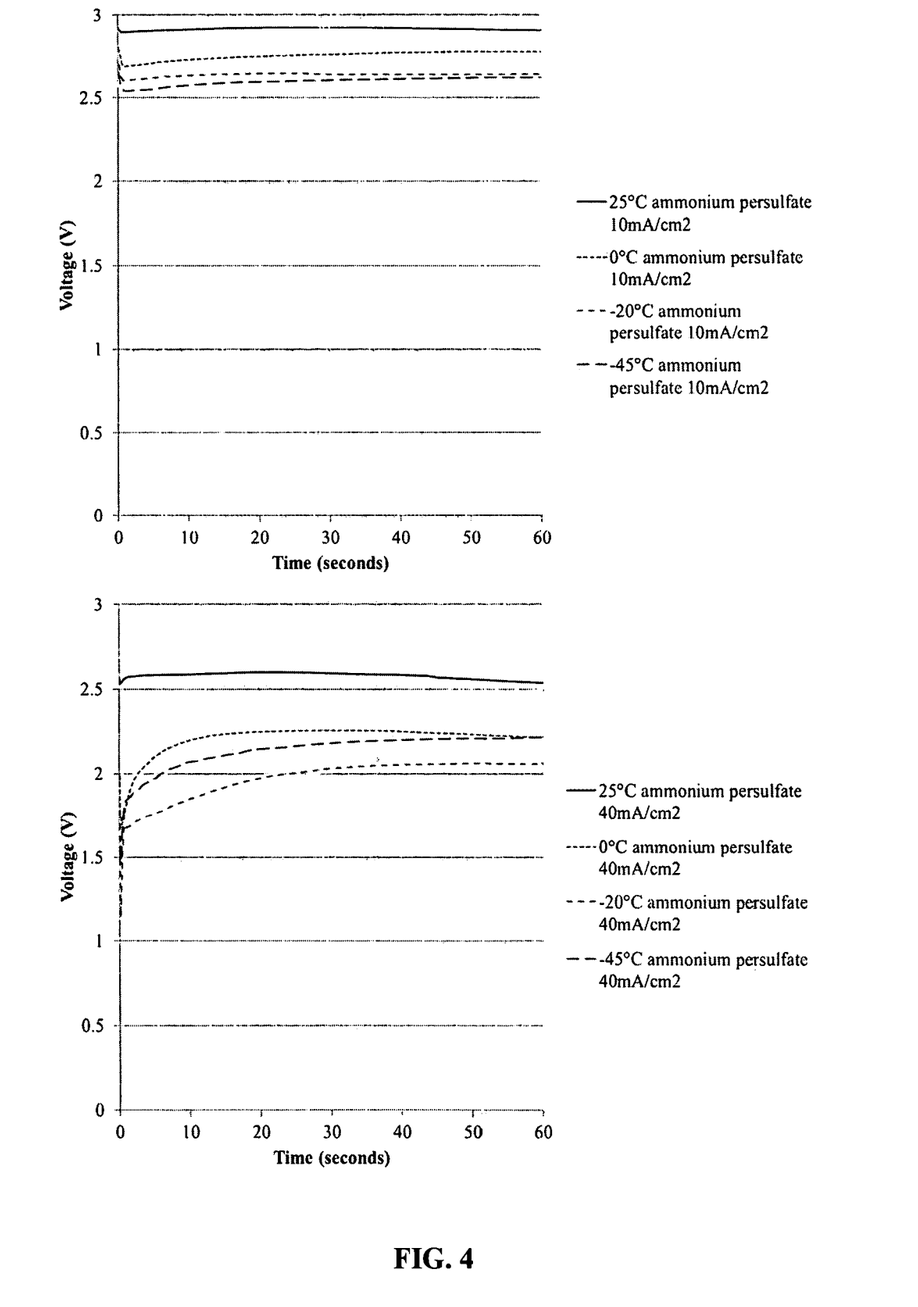
FIG. 4 is a discharge time (first 60 seconds) versus voltage diagram for cells made with ammonium persulfate type cathodes discharged at 10 mA/cm$^2$ and 40 mA/cm$^2$ over discharge temperature range of −45 to +25° C.
Figure 5:
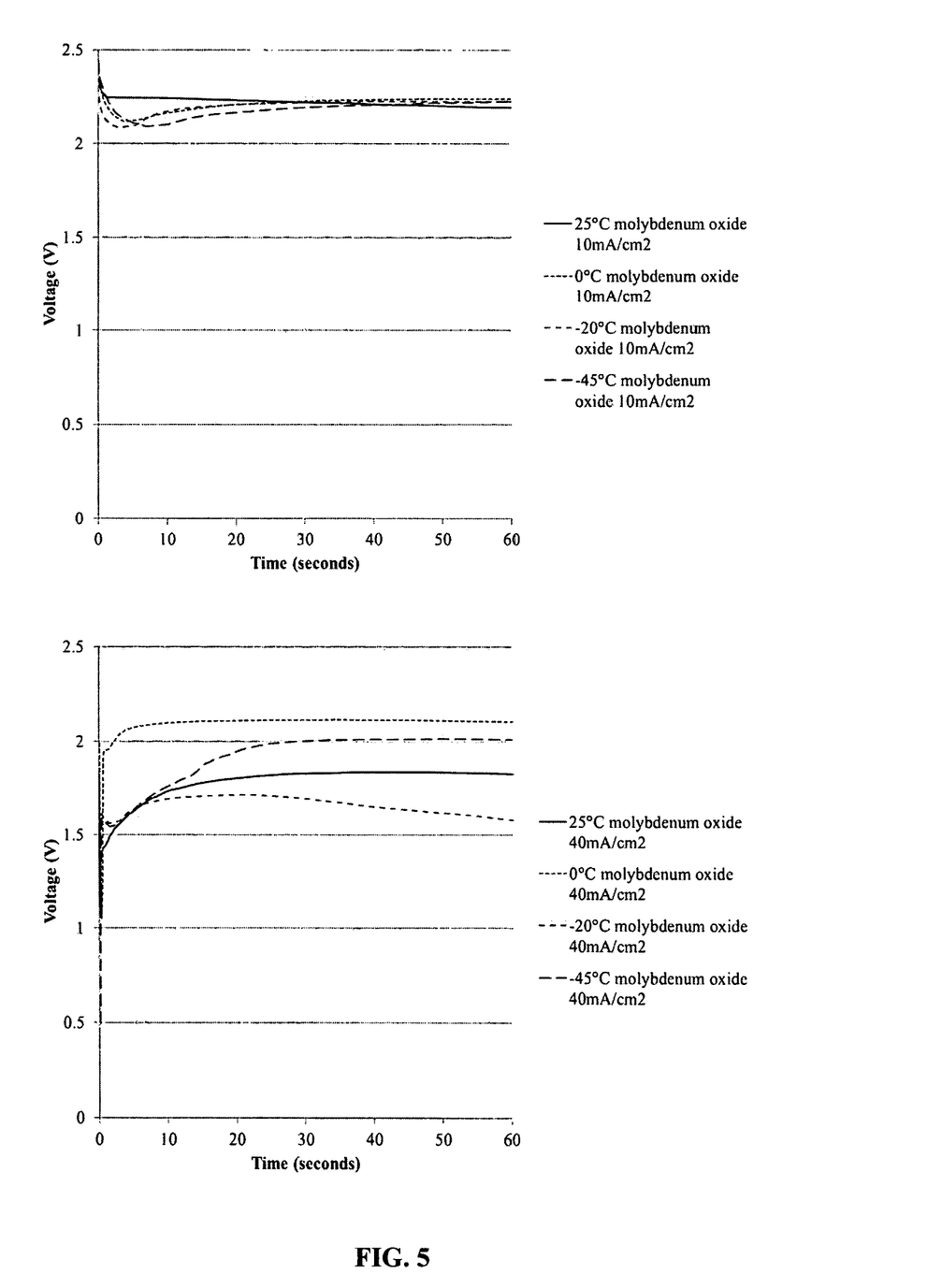
FIG. 5 is a discharge time (first 60 seconds) versus voltage diagram for cells made with molybdenum oxide type cathodes discharged at 10 mA/cm$^2$ and 40 mA/cm$^2$ over discharge temperature range of −45 to +25° C.
Figure 6:
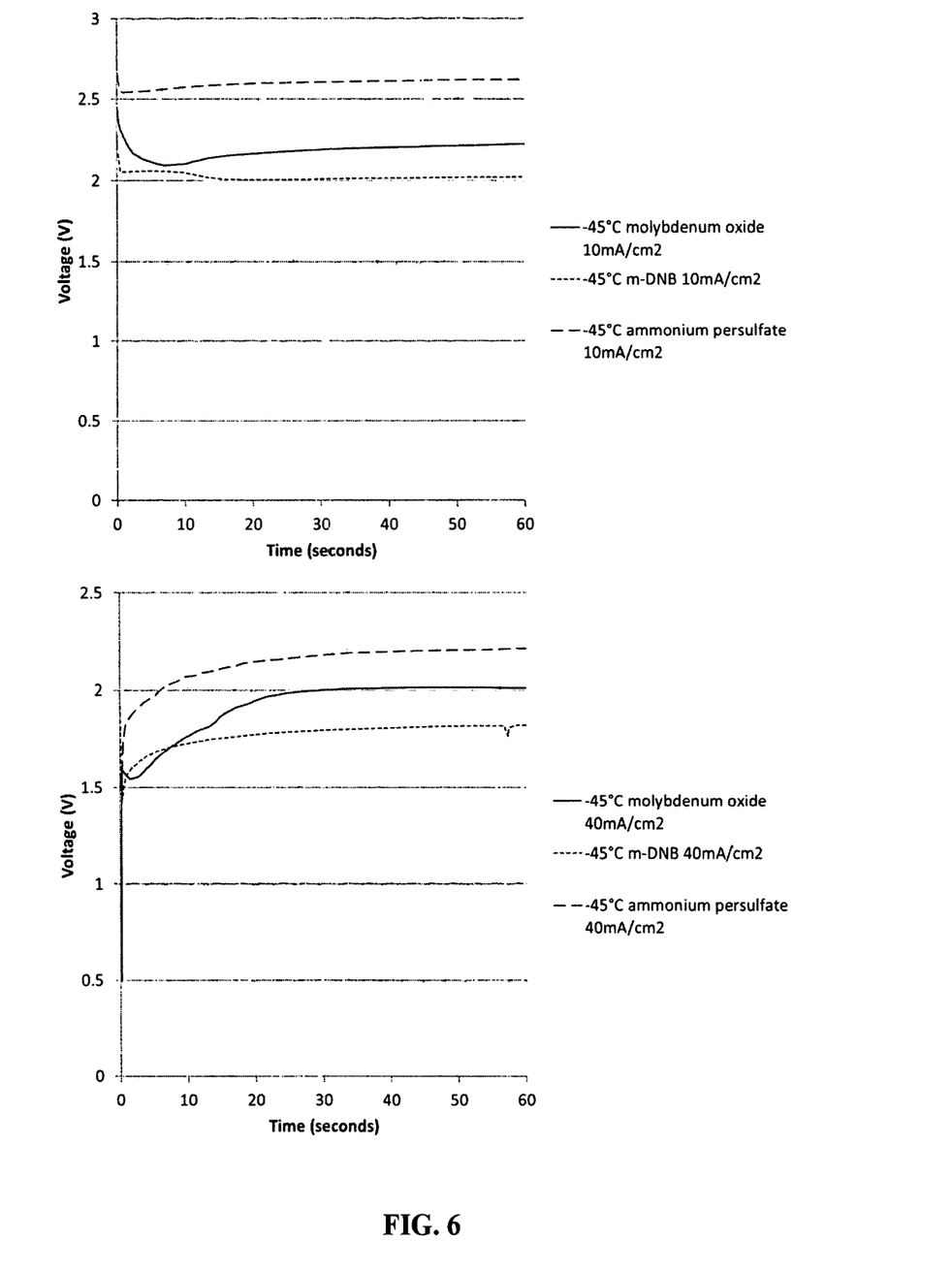
FIG. 6 is a discharge time (first 60 seconds) versus voltage diagram for cells made with the selected cathodes discharged at 10 mA/cm$^2$ and 40 mA/cm$^2$ at −45° C.

Referring now to the FIG. 2, which is another embodiment of the invention, showing ammonium based low temperature primary or reserve battery 1A of the invention, comprising: an alkali metal, such as lithium foil anode 2A, in contact with metal case 3A, as current collector; a cathode 4A such as molybdenum oxide $MoO_3$, or a permanganate in contact with and coated on stainless steel grid collector 5A, and both are cylindrically wound over pressure ampoule 8A; a separator 6A, such as 90% porous non-woven glass paper between said cathode 4A and anode 2A; and electrolyte 7A, such as ammonia $NH_3$ with a salt like $LiPF_6$ dissolved therein and stored in the pressure ampoule 8A, preferably of glass material.

Battery components 2A to 6A are sealed dry in moisture-proof enclosure 9A, comprising the metal case 3A, insulating layer 11A, metal plug 10A with positive metal pin 12A, connected to metal disc 5B, and sealed with a glass seal 13A.

The collector 5A is in contact with the metal disk 5B having the pin 12A attached.

The battery 1A is activated by mechanically punching the wall of the ampoule 8A, only if the battery 1A is needed to power a device. All structures are heat and pressure and corrosion resistant.

The cathodes 4 and 4A described and shown in FIGS. 1 and 2 may be coated on the current collectors 5 and 5A by known various methods via a slurry comprising the active material, plastic binder and conductive carbon powder in a solvent, which solvent evaporates after coating.

Additionally, the described materials of the same named components may be interchangeable between the FIGS. 1 and 2. For example, the cathode 4 material persulfate salt may be used in cathode 4A and replace the molybdenum oxide, and vice versa.

The cathode's persulfate salt of the invention has a general structure represented by the formula: $X_2S_2O_8$, wherein X is representative of a cation with an ionic charge 1+(such as Na+, K+, $NH_4$+) with associated anion of $S_2O_8^{2-}$, which is another embodiment of the invention.

The battery electrolyte of the invention is non-aqueous electrolyte, and comprises at least one non-aqueous solvent selected from the group including: $NH_3$, methyl format, diethyl ether and dimethoxy ether, with at least one salt selected from the group including: $LiPF_6$, $LiBF_4$, LiTFSI, LiSCN, $NH_4SCN$, KSCN and $LiNO_3$, dissolved therein, which is another embodiment of the invention.

The above cathode's active material structure may be also made in pad form, using a fibrous binder in combination with a conductive substrate, which is another embodiment of the invention. (Not shown).

Another cathode structure may have also the above active materials doped into porous conductive substrate, which is another embodiment of the invention. (Not shown).

Another cathode structure may have also the above active materials with a binder pressed into a conductive substrate, which is another embodiment of the invention. (Not shown).

Another cathode structure made of the above materials may be also made as a casted free-standing film or plate, in contact with a current collector, which is another embodiment of the invention. (Not shown).

The separators in the described batteries of the invention may be also made from a porous polymer or a solid state ion conductive film.

The anodes in the described batteries of the invention may be also composed from alloyed alkali metal, or alkaline earth metal, or alloyed alkaline earth metal.

The FIGS. 3, 4, 5, and 6 are showing discharge times versus voltage of the cells having different cathodes at various temperatures for a comparison.

The cathodes are based on: ammonium persulfate, molybdenum oxide and m-DNB.

It will thus be seen, that high power density, low temperature ammonium based batteries have been provided, with which the objects of the invention are achieved.

We claim:

1. A non-aqueous reserve battery having ammonia based electrolyte, an alkaline earth metal based anode, a porous electrically non-conductive separator, and a cathode, which cathode's active materials are selected from the group including persulfate salt, molybdenum oxide, and a permanganate salt.

2. A non-aqueous battery as described in claim 1, in which said cathode active material with a binder and conductive carbon powder is coated on a conductive substrate material.

3. A non-aqueous battery as described in claim 1, in which said cathode active material with a fibrous binder and carbon conductive powder included therein is in a pad form, and said pad is in contact with a conductive substrate material.

4. A non-aqueous battery as described in claim 1, in which said cathode active material with a binder and conductive carbon is doped into a porous conductive substrate material.

5. A non-aqueous battery as described in claim 1, in which said cathode active material with a binder and conductive carbon is pressed onto a conductive substrate material.

6. A non-aqueous battery as described in claim 1, which battery has horizontally stacked flat circular cells.

7. A non-aqueous battery as described in claim 1, which battery is in a cylindrical form having said cathode wound.

8. A non-aqueous battery as described in claim 1, in which battery said separator(s)' material is a porous glass non-woven paper.

9. A non-aqueous battery as described in claim 1, in which battery said separator(s)' material is a porous polymer film.

10. A non-aqueous battery as described in claim 1, in which said electrolyte is non-aqueous and contains ammonia $NH_3$ with at least one salt selected from the group including: $LiPF_6$, $LiBF_4$, LiTFSI, LiSCN, $NH_4SCN$, KSCN, and $LiNO_3$, dissolved therein.

11. A non-aqueous reserve battery described in claim 1, in which said persulfate salt has a general structure represented by the formula: $X_2S_2O_8$, wherein X is a cation with an ionic charge 1+ selected from the group including: $Na^+$, $K^+$, and $NH_4^+$ with associated anion of $S_2O_8^{2-}$.

* * * * *